(12) United States Patent
Hwu et al.

(10) Patent No.: US 11,873,006 B2
(45) Date of Patent: Jan. 16, 2024

(54) VIRTUAL LANE ESTIMATION USING A RECURSIVE SELF-ORGANIZING MAP

(71) Applicant: GM GLOBAL TECHNOLOGY OPERATIONS LLC, Detroit, MI (US)

(72) Inventors: Tiffany J. Hwu, San Diego, CA (US); Rajan Bhattacharyya, Sherman Oaks, CA (US); Michael J. Daily, Thousand Oaks, CA (US); Kyungnam Kim, Oak Park, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 377 days.

(21) Appl. No.: 17/026,522

(22) Filed: Sep. 21, 2020

(65) Prior Publication Data
US 2022/0089183 A1  Mar. 24, 2022

(51) Int. Cl.
| | | |
|---|---|---|
| *B60W 60/00* | (2020.01) | |
| *G01C 21/00* | (2006.01) | |
| *G06N 3/04* | (2023.01) | |
| *B60W 10/04* | (2006.01) | |

(Continued)

(52) U.S. Cl.
CPC ........ *B60W 60/0011* (2020.02); *B60W 10/04* (2013.01); *B60W 30/12* (2013.01);
(Continued)

(58) Field of Classification Search
CPC .. B60W 60/0011; B60W 10/04; B60W 30/12; B60W 60/0027; G01C 21/3407; G01C 21/3815; G01C 21/3492; G01C 21/3602; G01C 21/3611; G01C 21/3635; G01C 21/3644; G01C 21/3676; G01C 21/3819; G01C 21/3878; G06N 3/04;
(Continued)

(56) References Cited

U.S. PATENT DOCUMENTS

| | | | |
|---|---|---|---|
| 9,015,093 B1 * | 4/2015 | Commons | G01C 21/3602 706/26 |
| 10,026,506 B1 * | 7/2018 | LaBorde | G05D 1/0088 |

(Continued)

OTHER PUBLICATIONS

Collision free path planning and control of wheeled mobile robot using Kohonen self-organising map (Year: 2005).*

(Continued)

*Primary Examiner* — Fadey S. Jabr
*Assistant Examiner* — Faris Asim Shaikh
(74) *Attorney, Agent, or Firm* — Quinn IP Law (57) ABSTRACT

A virtual lane estimation system includes a memory device, a sensor and a computer. The memory device is configured to store a road map that corresponds to a portion of a road ahead of a vehicle. The sensor is configured to observe a plurality of trajectories of a plurality of neighboring vehicles that traverse the portion of the road. The computer is configured to initialize a recursive self-organizing map as a plurality of points arranged as a two-dimensional grid aligned with the road map, train the points in the recursive self-organizing map in response to the trajectories, generate a directed graph that contains one or more virtual lanes through the road map in response to the points trained to the trajectories, and generate a control signal that controls navigation of the vehicle through the portion of the road in response to the virtual lanes in the directed graph.

20 Claims, 4 Drawing Sheets

(51) Int. Cl.
  *G01C 21/34* (2006.01)
  *G06N 3/08* (2023.01)
  *B60W 30/12* (2020.01)
(52) U.S. Cl.
  CPC ..... *B60W 60/0027* (2020.02); *G01C 21/3407* (2013.01); *G01C 21/3815* (2020.08); *G06N 3/04* (2013.01); *G06N 3/08* (2013.01)
(58) Field of Classification Search
  CPC ........ G06N 3/08; G06N 3/088; G06N 3/0427; G06N 3/0454; G06N 5/022; G06N 3/0445; G06N 3/049; G06N 3/067; G06N 3/006; G06N 3/008; G06N 3/042; G06N 3/02; G06N 3/0464; G06N 3/094; G06N 7/046; G06V 10/454; G06V 10/82; G06V 10/10; G06V 10/44; G06V 20/64; G06V 20/56; G06F 18/24147; G06F 18/23; G06F 18/2453; G06T 2207/20084; G06T 7/33
  See application file for complete search history.

(56) References Cited

U.S. PATENT DOCUMENTS

| | | | |
|---|---|---|---|
| 2011/0064268 A1* | 3/2011 | Cobb | G06V 20/52 382/160 |
| 2015/0324501 A1* | 11/2015 | Desell | G01C 23/00 703/2 |
| 2019/0004535 A1* | 1/2019 | Huang | G06N 3/045 |
| 2020/0302662 A1* | 9/2020 | Homayounfar | G06V 10/454 |
| 2021/0020045 A1* | 1/2021 | Huang | G05D 1/021 |
| 2021/0089040 A1* | 3/2021 | Ebrahimi Afrouzi | G05D 1/0248 |
| 2021/0108926 A1* | 4/2021 | Tran | G06T 17/05 |
| 2021/0200220 A1* | 7/2021 | Zhu | G01C 21/3453 |

OTHER PUBLICATIONS

Directed graph—Wikipedia (Year: 2020).*
Self Organizing Maps. (Kohonen's maps) _ by Achraf Khazri _ Towards Data Science (Year: 2019).*
Self Organizing Maps. Recently, I learned about SOMs while . . . _ by Abhinav Ralhan _ Medium (Year: 2018).*
L. Yun, K. Uchimura; Using Self-Orgaizing Map for Road Network Extraction From Ikonos Imagery; International Journal of Innovative Computing Information and Central vol. 3, No. 3, Oct. 2006; pp. 641-656.
T. Voegtlin; Recursive self-organizing maps: Neural Networks 15; 2002; pp. 979-991.
T. Kohonen; The Self-Organizing Map: IEEE vol. 78, No. 9; Sep. 1990.

* cited by examiner

VIRTUAL LANE ESTIMATION USING A RECURSIVE SELF-ORGANIZING MAP

INTRODUCTION

The present disclosure relates to a system and a method for virtual lane estimation using a recursive self-organizing map.

Lane detection of road markings is a component of many autonomous vehicles. Lane departure warning systems are available in many commercial vehicles. However, the commercial warning systems rely on small visual cues and have many false positive detections. Such systems are meant to aid human drivers as opposed to being fully autonomous. Even with more accurate lane detectors being developed in the autonomous vehicle market, the lane detectors still do not account for instances in which the road markings are clear, but conditions make it difficult to drive normally within those lanes. Furthermore, while the autonomous vehicles are unable to detect the road markings or encounter unexpected situations, the vehicles may not have a model of reasonable driving behavior.

What is desired is a system and/or a technique for virtual lane estimation that determines drivable lanes by learning from the behavior of other vehicles.

SUMMARY

A virtual lane estimation system is provided herein. The virtual lane estimation system includes a memory device, a sensor and a computer. The memory device is configured to store a road map that corresponds to a portion of a road ahead of a vehicle. The sensor is configured to observe a plurality of trajectories of a plurality of neighboring vehicles that traverse the portion of the road. The computer is configured to initialize a recursive self-organizing map as a plurality of points arranged as a two-dimensional grid aligned with the road map, train the plurality of points in the recursive self-organizing map in response to the plurality of trajectories, generate a directed graph that contains one or more virtual lanes through the road map in response to the points trained to the plurality of trajectories, and generate a control signal that controls navigation of the vehicle through the portion of the road in response to the one or more virtual lanes in the directed graph.

In one or more embodiments of the virtual lane estimation system, the training of the recursive self-organizing map uses the plurality of trajectories one at a time.

In one or more embodiments of the virtual lane estimation system, a recurrent layer of the recursive self-organizing map contains a plurality of weights of the plurality of points at an end of the training.

In one or more embodiments of the virtual lane estimation system, a grid layer of the recursive self-organizing map contains the plurality of trajectories at the end of the training.

In one or more embodiments of the virtual lane estimation system, the computer is further configured to select a random trajectory from the plurality of trajectories during the training.

In one or more embodiments of the virtual lane estimation system, the computer is further configured to isolate a first point of the random trajectory.

In one or more embodiments of the virtual lane estimation system, the computer is further configured to apply the first point to the recursive self-organizing map during the training.

In one or more embodiments of the virtual lane estimation system, the computer is further configured to isolate a second point of the random trajectory and apply the second point to the recursive self-organizing map during the training.

In one or more embodiments of the virtual lane estimation system, the recursive self-organizing map is a self-organizing map with an input layer from a current time step, and the input layer is an output layer from a previous time step, and the self-organizing map implements a neural network with the output layer arranged as the two-dimensional grid.

A method for virtual lane estimation is provided herein. The method includes reading a road map that corresponds to a portion of a road ahead of a vehicle, initializing a recursive self-organizing map as a plurality of points arranged as a two-dimensional grid aligned with the road map using a computer of the vehicle, and observing a plurality of trajectories of a plurality of neighboring vehicles that traverse the portion of the road using a sensor of the vehicle. The method further includes training the plurality of points in the recursive self-organizing map in response to the plurality of trajectories, generating a directed graph that contains one or more virtual lanes through the road map in response to the points trained to the plurality of trajectories, and controlling a power plant to navigate the vehicle through the portion of the road in response to the one or more virtual lanes in the directed graph.

In one or more embodiments of the method, the training of the recursive self-organizing map uses the plurality of trajectories one at a time.

In one or more embodiments of the method, a recurrent layer of the recursive self-organizing map contains a plurality of weights of the plurality of points at an end of the training.

In one or more embodiments of the method, a grid layer of the recursive self-organizing map contains the plurality of trajectories at the end of the training.

In one or more embodiments of the method, the training includes selecting a random trajectory from the plurality of trajectories.

In one or more embodiments of the method, the training includes removing a first point of the random trajectory.

In one or more embodiments of the method, the training includes applying the first point to the recursive self-organizing map.

In one or more embodiments of the method, the training includes removing a second point of the random trajectory and applying the second point to the recursive self-organizing map.

In one or more embodiments of the method, the recursive self-organizing map comprises a self-organizing map with an input layer from a current time step, and the input layer is an output layer from a previous time step.

In one or more embodiments of the method, the self-organizing map implements a neural network with the output layer arranged as the two-dimensional grid.

A vehicle is provided herein. The vehicle includes a memory device, a sensor, a computer, and a power plant. The memory device is configured to store a road map that corresponds to a portion of a road ahead of the vehicle. The sensor is configured to observe a plurality of trajectories of a plurality of neighboring vehicles that traverse the portion of the road. The computer is configured to initialize a recursive self-organizing map as a plurality of points arranged as a two-dimensional grid aligned with the road map, train the plurality of points in the recursive self-organizing map in response to the plurality of trajectories, generate a directed graph that contains one or more virtual lanes through the road map in response to the points trained to the plurality of trajectories, and generate a control signal that controls navigation of the vehicle through the portion of the road in response to the one or more virtual lanes in the directed graph. The power plant is configured to propel the vehicle in response to the control signal.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure perform virtual lane estimation system for autonomous vehicles by observing past trajectories of other vehicles traveling on the same road. A virtual lane may be defined as an optional path of travel for moving vehicles. The optional path may be useful in situations where the lane markings on the road are unclear, or for unexpected road conditions (e.g., an obstacle in the road) that cause the vehicles to circumvent default traffic rules of lane travel.

The system generally uses a recursive self-organizing map (SOM) that takes as an input one or multiple observed vehicle trajectories and presented an averaged trajectory in the form of a directed graph. By using the recursive self-organizing map, the system may find drivable lanes, and capture temporal data, such as speed, direction and lane-changing preferences.

Nodes of the directed graph may represent physical coordinates along the trajectory. Directed edges of the directed graph may capture a sequential order in which the nodes were observed. The directed graph may subsequently be used in graph-based techniques to direct the movement of the autonomous vehicle and/or predict the trajectories of other vehicles in the future.

Figure 1:
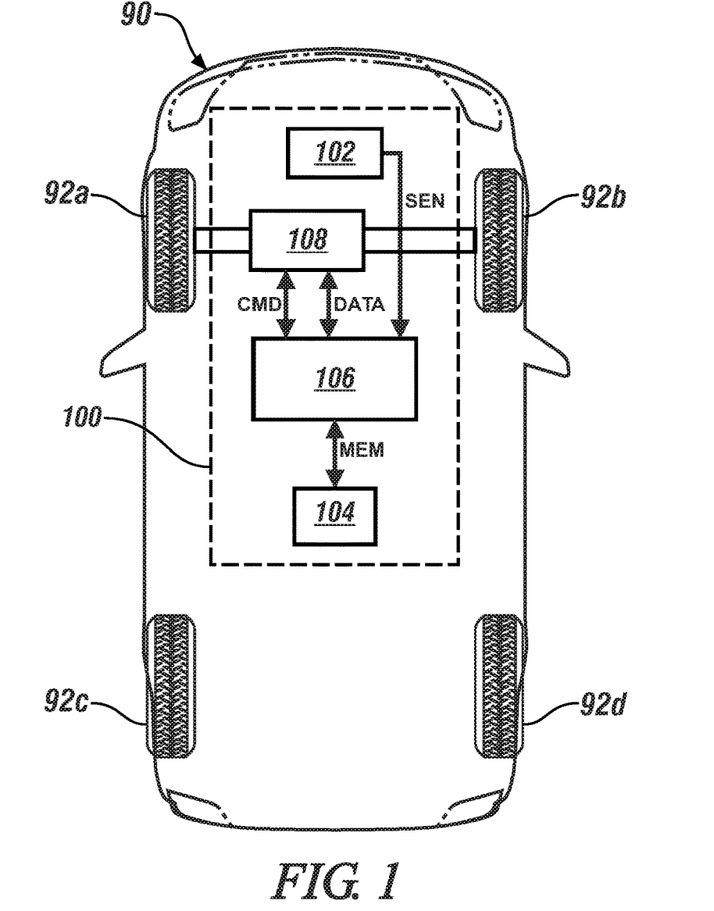
FIG. 1 is a schematic plan diagram illustrating a vehicle implementing an autonomous driving system.

Referring to FIG. 1, a schematic plan diagram illustrating a vehicle 90 is shown. The vehicle 90 generally comprises multiple wheel 92a-92d and an autonomous driving system 100. The autonomous driving system 100 generally comprises a sensor 102, a memory device 104, a computer 106 and a power plant 108.

A signal (e.g., SEN) may be generated by the sensor 102 and transferred to the computer 106. The sensor signal SEN may carry information about neighboring vehicles in a portion of the road ahead of the vehicle 90. A signal (e.g., CMD) may be exchanged between the computer 106 and the power plant 108. The command signal CMD may convey commands to the power plant 108 to control at least speed, steering and braking operations of the vehicle 90. A signal (e.g., DATA) may be exchanged between the computer 106 and the power plant 108. The data signal DATA may transfer data related to the operations of the power plant 108 between the power plant 108 and the computer 106. A signal (e.g., MEM) may be exchanged between the computer 106 and the memory device 104. The memory signal MEM may convey information that defines the roads in an area used by the vehicle 90. In various embodiments, the information may include a road map of a physical road (or surface). Other types of information may be implemented to meet the design criteria of a particular application.

The vehicle 90 may be implemented as an automobile (or car). In various embodiments, the vehicle 90 may include, but is not limited to, a passenger vehicle, a truck, an autonomous vehicle, a gas-powered vehicle, an electric-powered vehicle, a hybrid vehicle and/or a motorcycle. Other types of vehicles 90 may be implemented to meet the design criteria of a particular application.

The wheels 92a-92d may implement road wheels. The wheels 92a-92d are generally operational to provide for movement of the vehicle 90 about the ground. In various embodiments, each wheel 92a-92d may include a tire mounted on a rim. The wheels 92a-92d may be used to provide traction between the vehicle 90 and the ground on which the vehicle 90 is sitting.

The autonomous driving system 100 may implement a power plant and associated electronics suitable for autonomous, semi-autonomous and/or driver-assist operations. The autonomous driving system 100 is generally operational to read a road map that corresponds to a portion (or segment) of the road ahead of (or around) the vehicle 90, and initialize a recursive self-organizing map as multiple points arranged as a two-dimensional grid aligned with the road map. In various embodiments, the road map may be range from a few tens of feet to several hundreds of feet in a direction of travel of the vehicle 90. The road map may extend ahead of the vehicle 90 and/or behind the vehicle 90. The road map may also range from several tens of feet wide up to approximately one-hundred feet wide. The road map may extend to a left of the vehicle 90 and/or to a right of the vehicle 90.

The autonomous driving system 100 may be further operational to observe one or more trajectories of one or more neighboring vehicles traversing the portion of the road represented by the road map and train the points in the recursive self-organizing map in response to the trajectories. A directed graph that contains one or more virtual lanes through the road map may be generated by the autonomous driving system 100 in response to the points along the trajectories. The autonomous driving system 100 may subsequently navigate the vehicle 90 across the road corresponding to the road map in response to the virtual lanes in the directed graph.

The sensor 102 may implement an optical sensor and/or radio-frequency sensor. The sensor 102 is generally operational to sense the movement of the neighboring vehicles moving through the portion of the road about to be traversed by the vehicle 90. In various embodiments, the sensor 102 may implement one or more cameras configured to observe the neighboring vehicles ahead of the vehicle 90. In some embodiments, the sensor 102 may implement a radar device configured to track the neighboring vehicles. In other embodiments, the sensor 102 may be a transceiver configured to gather vehicle tokens generated by the neighboring vehicles. Each vehicle token may identify a particular neighboring vehicle and a respective position. The vehicle tokens may be gathered in a vehicle-to-vehicle manner and/or gathered from a database through a wireless network (e.g., a cellular network). In various embodiments, the sensor 102 may be further operational to sense and report lane boundaries painted on the road, where detectable.

The memory device 104 may implement a nonvolatile storage device. The memory device 104 is generally operational to store and present the road map information to the computer 106. The road map information may be presented to the computer 106 via the memory signal MEM. The road map information stored in the memory device 104 may be updated from time to time via the memory signal MEM to account for changes in the roads.

The computer 106 may implement one or more electronic control units. The computer 106 is generally operational to gather the sensor information from the sensor 102, read a local portion of the road map from the memory device 104, and determine one or more virtual lanes available to the vehicle 90. The computer 106 may encode the virtual lanes into a directed graph. In one or more embodiments, the computer 106 may subsequently use the virtual lane information in the directed graph to autonomously navigate the vehicle 90 across the road corresponding to the road map, semi-autonomously help navigate the vehicle 90 and/or provide driver assistance for traversing the road.

The power plant 108 may implement an engine, a transmission and a power train of the vehicle 90. The power plant 108 is generally operational to propel and steer the vehicle 90 in response to one or more commands received from the computer 106 in the signal CMD. The power plant 108 may provide operating information in the signal DATA back to the computer 106.

Figure 2:
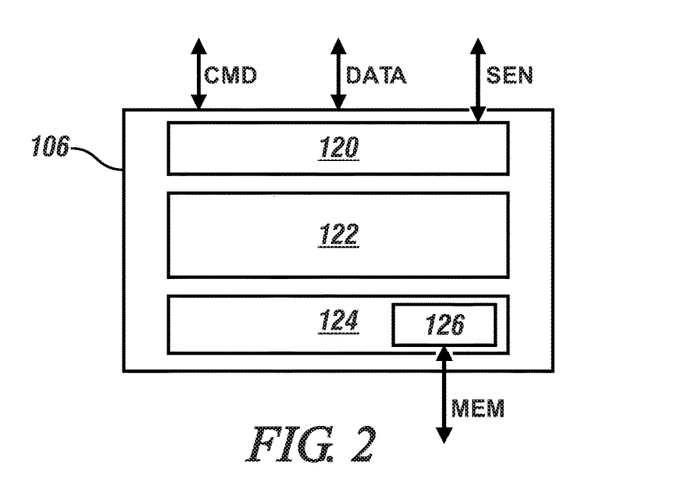
FIG. 2 is a schematic diagram of software in a computer in accordance with an exemplary embodiment of the autonomous driving system.

Referring to FIG. 2, a schematic diagram of an example architecture of software in the computer 106 is shown in accordance with an exemplary embodiment of the autonomous driving system 100. The software in the computer 106 generally comprises a hardware abstraction layer 120, a high-level cognitive system 122, and a sensor abstraction layer 124. The sensor abstraction layer 124 may include a map manager 126. The command signal CMD, the data signal DATA and the sensor signal SEN may be coupled to the hardware abstraction layer 120. The memory signal MEM may be coupled to the map manager 126.

The hardware abstraction layer 120 is generally operational to provide reception of information into the computer 106 and transmission of information out of the computer 106. The hardware abstraction layer 120 may be responsible for receiving the sensor data in the signa SEN from the sensor 102. The hardware abstraction layer 120 may exchange the command and data with the power plant 108 via the signal CMD and the signal DATA.

The high-level cognitive system 122 is generally operational to provide the autonomous, semi-autonomous and/or driver-assist decision processes. The high-level cognitive system 122 may receive the virtual lanes in the directed graphs from the sensor abstraction layer 124. The high-level cognitive system 122 may determine actions to be taken based on the virtual lanes, translate the actions into the commands and present the commands to the hardware abstraction layer 120 for subsequently transfers to the power plant 108.

The sensor abstraction layer 124 is generally operational to utilize the sensor data from the sensor 102 and power plant data from the power plant 108 to determine where the vehicle 90 is located and what other vehicles are in the vicinity. The sensor abstraction layer 124 may present the directed graph to the high-level cognitive system 122 to aid in navigation decisions.

The map manager 126 is generally operational to generate recursive self-organizing maps based on the road map data received from the memory device 104 and the trajectories of the neighboring vehicles observed by the sensor 102. The map manager 126 may determine one or more virtual lanes available to the vehicle 90 from the recursive self-organizing map. The virtual lanes may be formatted as the directed graph presented to the high-level cognitive system 122.

A self-organizing map generally defines a way to cluster high dimensional input data into spatially organized representations. The self-organizing map is commonly implemented as a neural network with an input layer for incoming data and an output layer arranged in a two dimensional grid. The output neurons may receive weight values from the input neuron, that represents a cluster center of the output neuron. For each iteration of training, a random point from a training dataset may be selected as the input to the network. The values for each output value may then be calculated as the weighted sum of inputs, with the neuron of highest value labeled as neuron U. The weights may be updated during the training. For an iteration S, a vector of weights going to an output neuron V for the next iteration S+1 may be incremented by the product of a neighborhood function between U and V, a learning rate, and a distance between the vector of weights going to U and weights going to V. Over many iterations, the weights of output neurons shift values to represent the distribution of the input data. For example, training a self-organizing map on two-dimensional data points arranged in a ring may shift the weight neurons of output neurons to cover that space.

A recursive self-organizing map generally allows for clustering of spatial and temporal data within a single representation. The recursive self-organizing maps may capture sequential relations between output clusters. A recursive self-organizing map includes a regular self-organizing map with an extra input layer that is a copy of the output layer from the previous time step. The resulting modified self-organizing map uses feedback to represent time. The value of each output neuron may be calculated as the weighted combination of output from just the current input and output from just the copy of the map at the previous time step. The weights from the current input at time t may be indicated as X(t) and the weights from the copy of the map from the previous time step may be indicated as Y(t). The two sets of weights may be trained separately using the same learning rules as in regular self-organizing maps. The training iterations are generally performed as before, but with the input data presented in the original temporal sequence that they were found. As a result, the X(t) weights perform clustering as before, and the Y(t) weights encode transition probabilities of moving from one cluster to the next in sequence.

Figure 3:
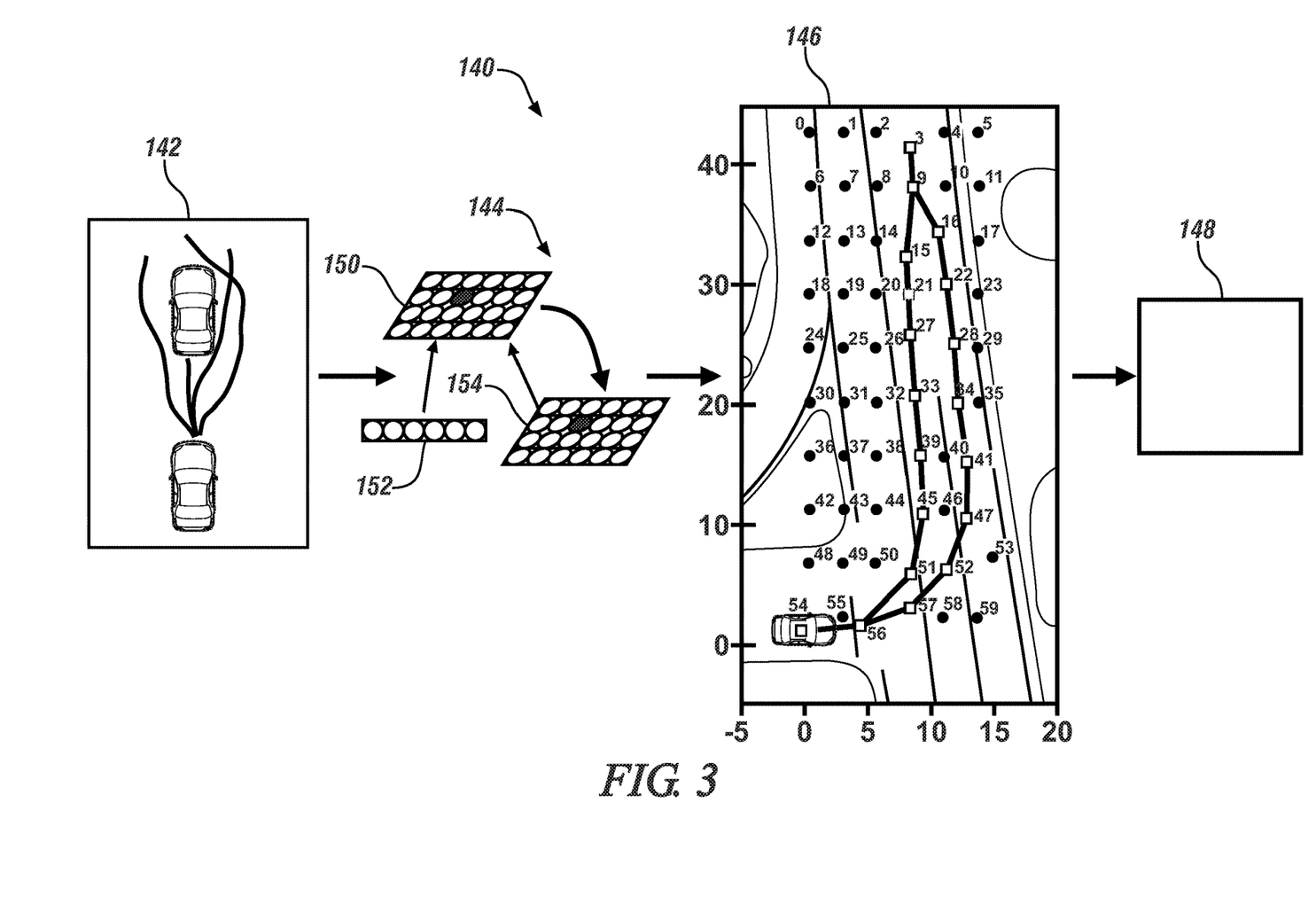
FIG. 3 is a flow diagram of an estimation method in accordance with an exemplary embodiment of the autonomous driving system.

Referring to FIG. 3, a flow diagram of an example implementation of an estimation method 140 is shown in accordance with an exemplary embodiment of the autonomous driving system 100. The estimation method (or process) 140 may be implemented by the autonomous driving system 100. The estimation method 140 generally comprises a step 142, a step 144, a step 146, and a step 148.

In the step 142, the sensor 102 may observe the paths of other vehicles driving through an area of interest. The area of interest is generally the road map through which the vehicle 90 is about to travel. Based on the observations, the computer 106 may initialize and train a recursive self-organizing map overlaid on the area of interest in the step 144. During each time step in the training, a current map 150 may be updated with a current input vector 152 and a copy of the map 154 at a previous time step. The current map 150, once updated, subsequently becomes the map 154 in a next time step. The time steps continue for multiple iterations while new input vectors 152 are added into the current map 150.

In the step 146, the computer 106 may determine one or more virtual lanes in the area of interest. The virtual lanes are generally drivable lanes used by the other vehicles that previously traversed the area of interest. Once the virtual lanes are determined, the computer 106 may generate a directed graph in the step 148. The directed graph may include spatial points in each virtual lane. The directed graph may subsequently be used by the computer 106 to make navigational decisions for perception, prediction and/or planning.

Figures 4, 5, 7:
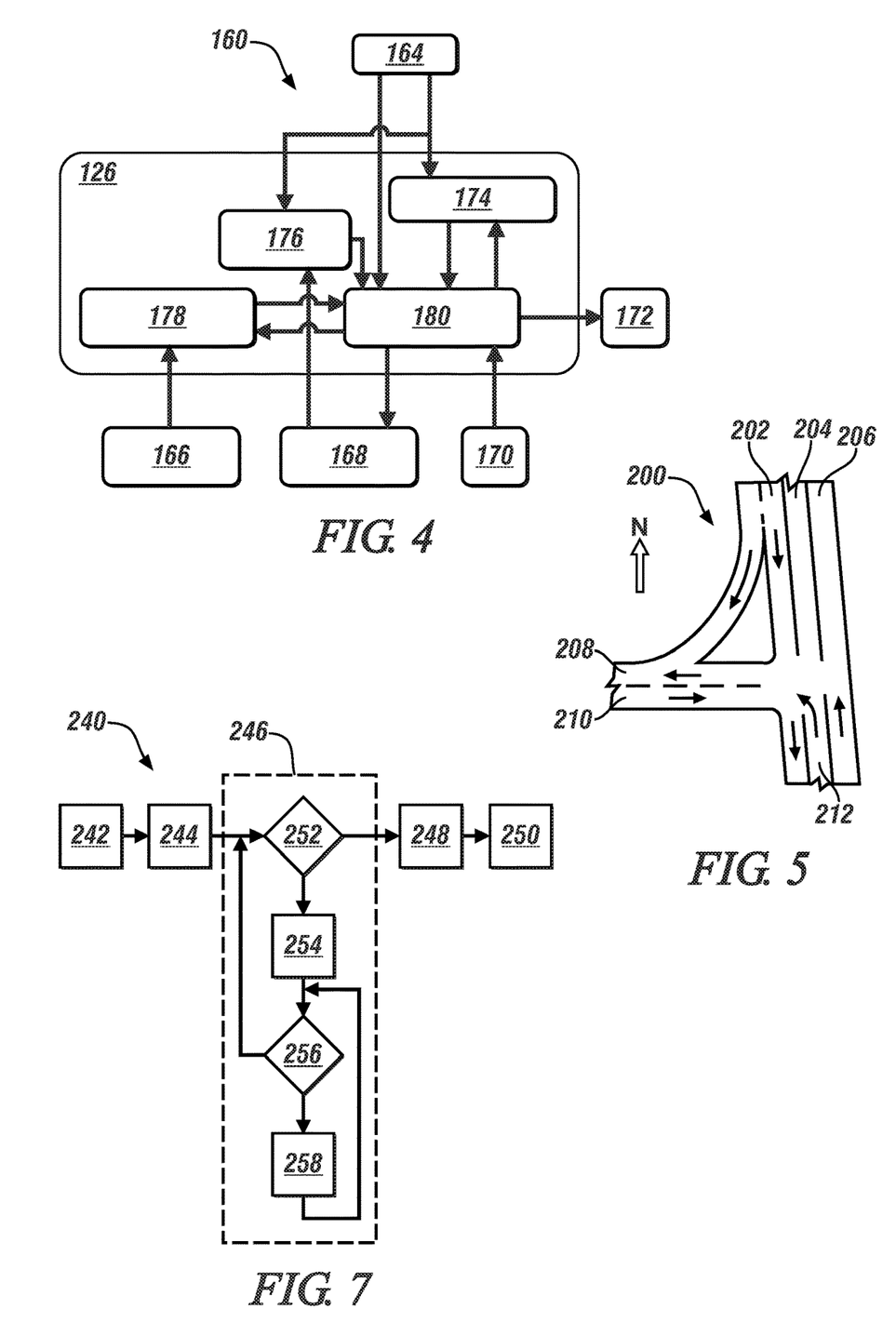
FIG. 4 is a schematic diagram of an environment around a map manager in accordance with an exemplary embodiment of the autonomous driving system.
FIG. 5 is a schematic plan diagram of a portion of a road in accordance with an exemplary embodiment of the autonomous driving system.
FIG. 7 is a flow diagram of a processing method in accordance with an exemplary embodiment of the autonomous driving system.

Referring to FIG. 4, a schematic diagram of an example environment 160 around the map manager 126 is shown in accordance with an exemplary embodiment of the autonomous driving system 100. The environment 160 generally comprises the map manager 126, a perception function 164, a high-level planner function 166, a recursive self-organizing map 168, a road map 170, a hypothesizer-and-decoder function 172, a computer matrix transformation function 174, a lane center inference function 176, a route generation function 178, and an internal map representation function 180.

The perception function 164 is generally operational to provide real-time data and update data to the map manager 126. The real-time data may include, but is not limited to, lane boundaries, neighboring vehicle trajectories and/or neighboring vehicle tokens obtained by the sensor 102. The update data may include map updates to the road data stored in the memory device 104.

The high-level planner function 166 is generally operational to provide route start points and route end points to the map manager 126. The points are generated according to ultimate goal destinations defined by external operators and may also include a sequence of waypoints broadly separated in space, such as intersections, which are suitable to reach the goal destinations.

The recursive self-organizing map 168 may provide a dynamic map of the area of interest and the virtual lanes. The virtual lanes are generally based on the observed neighboring vehicle trajectories and/or vehicle tokens.

The road map 170 may by an electronic map stored in the memory device 104 and represents the road upon which the vehicle 90 moves. A segment of the road map 170 may be read by the map manager 126 as part of an initialization of the recursive self-organizing map 168.

The hypothesizer-and-decoder function 172 may be operational to generate navigation decisions based on data in the directed graphs received from the map manager 126. The data in the directed graphs may include, but is not limited to, the virtual lanes, lane boundaries, lane centers, road sign locations and current light state.

The computer matrix transformation function 174 may be operational to generate updated vehicle tokens. The updates may be based on the vehicle tokens received from the sensor 102 and the lane lines defined in the road map 170. The update vehicle tokens may be presented to the internal map representation function 180

The lane center inference function 176 is generally operational to determine lane center information based on the recursive self-organizing map 168. The lane center information may account for the map updates. The lane center information may be transferred to the internal map representation function 180.

The route generation function 178 is generally operational to identify a current location and direction of travel of the vehicle 90 based on the rout information received from the high-level planner function 166. The current location and direction of travel generally allows the map manager 126 to determine a portion of the road map 170 to access from the memory device 104.

The internal map representation function 180 is generally operational to train the recursive self-organizing map 168. The internal map representation function 180 may also be operational to generate the directed graphs with the virtual lanes, lane boundaries, lane centers, road sign locations, and current light state, etc. The directed graphs may be presented to the hypothesizer-and-decoder function 172 to aid in navigating the vehicle 90.

Referring to FIG. 5, a schematic plan diagram of an example portion of a road 200 is shown in accordance with an exemplary embodiment of the autonomous driving system 100. The road 200 may illustrate an intersection between a north-south road and an east-west road. The road 200 generally comprise a southbound lane 202, a center lane 204 north of the intersection, a northbound lane 206, a westbound lane 208, an eastbound lane 210, and a center (or left turn) lane 212 south of the intersection. The road 200 may be used in explaining how to train the recursive self-organizing map 168. In the example, the center lane 204 does not officially exist as a northbound lane and would not be an option for autonomous vehicles. Autonomous vehicles operating solely from the road map 170 may normally wait for gaps in the traffic from both the north and the south when making the left turn, which may be difficult during peak traffic times. By observing other cars using the center lane 204, the recursive self-organizing map may create a virtual lane to represent common and/or newly discovered options of movement.

Figure 6:
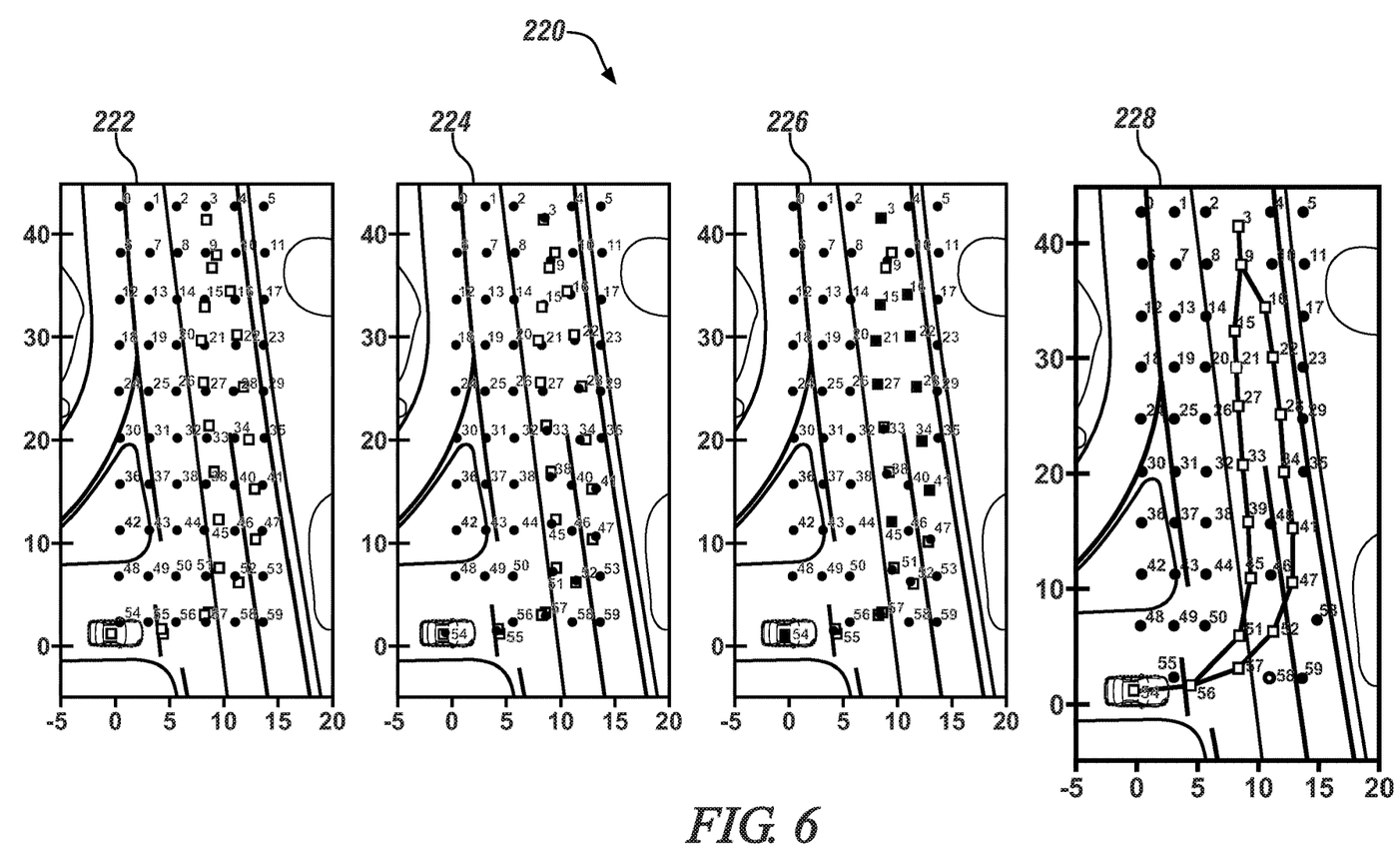
FIG. 6 is a flow diagram of a training sequence in accordance with an exemplary embodiment of the autonomous driving system.

Referring to FIG. 6, a flow diagram of an example implementation of a training sequence 220 is shown in accordance with an exemplary embodiment of the autonomous driving system 100. The training sequence 220 may be implemented by the computer 106. The training sequence 220 generally comprises an initial condition 222, an iterated condition 224, a further iterated condition 226, and a final condition 228.

In the initial condition 222, the map manager 126 may align a uniform grid of points with the road map 170, received from the memory device 104, along an intended route. The grid may be a two-dimensional grid of evenly spaced points. The grid points are illustrated in the example as multiple (e.g., 60) black dots, labeled 0-59. The vehicle 90 generally resides outside or at an edge of the grid at the initial condition 222. In the example, the vehicle 90 may be in the eastbound lane 210 approaching the intersection.

The vehicle 90 may observe other vehicles traveling through a portion of the road that corresponds to the road map 170 along approximately the same route that the vehicle 90 is intending to follow. The observations may be used to create a training dataset of observed trajectories. In the example, two other vehicles previously made a left turn from the eastbound lane 80 into the northbound lane 206. The map manager 126 may extract two observed trajectories from the observations, one of a vehicle turning left using the center lane 204, and one using the regular northbound lane 206 from public map data.

The observations are generally made before the vehicle 90 reaches the intersection or are obtained from a database before or when the vehicle 90 reaches the intersection. The map manager 126 may overlay spatial coordinates of the two earlier trajectories on the recursive self-organizing map. The spatial coordinates of two trajectories the are illustrated as white squares. A rightmost trajectory of the observed trajectories generally shows the left turn directly into the northbound lane 206. The leftmost trajectory of the observed trajectories shows the left turn into the center lane 204 and a subsequent shift into the northbound lane 206.

The map manager 126 may train the recursive self-organizing map 168 based on the observed trajectories. The training is generally based on the two trajectories in alternation, inputting discrete point coordinates of the trajectories in the observed order. The iterated condition 224 generally illustrates the points after multiple (e.g., 10) iterations of the recursive self-organizing map 168. Several of the points (black dots) may be moved during the iterations toward a nearest observed discrete point coordinate (white squares).

The map manager 126 may continue to iterate the points if the points to not sufficiently converge with (or overlap or cover) the observed coordinates and/or a predetermined number of iterations have been performed. The further iterated condition 226 generally illustrates the points after multiple (e.g., 20) iterations of the recursive self-organizing map 168. In the final condition 228, the recursive self-organizing map 168 may converge the points to the discrete points along the two observed trajectories. In the example, the rightmost trajectory may include the points 56, 57, 52, 47, 41, 34, 28, 22, 16, 9, and 3. The leftmost trajectory may include the points 56, 51, 45, 39, 33, 27, 21, 15, 9, and 3.

During the training, the map manager 126 may examine recursive weights, $y(x)$, to look at transitions between output nodes. The $y(x)$ weights may be used to create directed edges in a final directed graph. For each non-zero weight in $y(x)$, a directed edge may be added for corresponding nodes. Thereafter, a set of nodes that are connected by directed edges may be returned as the final graph representation of the virtual lanes (shown as the white squares).

The directed graph may subsequently be used in a planning technique. For instance, a Dijkstra's algorithm may utilize the directed graph to compute a decision for the vehicle 90 to take the leftmost trajectory initially into the center lane 204, as opposed to turning directly into the northbound lane 206. The directed edges in the graph may be given pressure scores related to the amount of surrounding traffic. With oncoming cars from the south, pressure scores for edges in the northbound lane 206 may be higher, causing the vehicle 90 to choose the center lane 204.

Referring to FIG. 7, a flow diagram of an example implementation of a processing method 240 is shown in accordance with an exemplary embodiment of the autonomous driving system 100. The processing method (or process) 240 may be implemented by the autonomous driving system 100. The processing method 240 generally comprises a step 242, a step 244, a step 246, a step 248, and a step 250. The step 246 generally comprises a step 252, a step 254, a step 256, and a step 258.

In the step 242, data for the recursive self-organizing map 168 may be collected by the sensor 102, the memory device 104 and the computer 106. The recursive self-organizing map 168 may be initialized by the map manager 126 in the step 244. Initialization may include creating the initial grid aligned with a two-dimensional area on the road map 170. A number of training sessions may also be set during the initialization.

Training of the recursive self-organizing map 168 may be performed in the step 246 by the map manager 126. At the end of the training, the recursive self-organizing map 168 may be finalized. A grid layer in the final recursive self-organizing map 168 may cover the discrete point coordinates of the observed trajectories. A recurrent layer may include the weights for the recursive self-organizing map 168. The recurrent layer receives a current time input, a previous time memory state, and a previous time output at a current time. The recurrent layer subsequently updates the memory state to the current time, and generates an output at the current time. In the step 250, a directed graph with virtual lanes is created from the grid layer by the map manager 126.

As part of the training in the step 246, the map manager 126 may check if the training is in progress or finished in the step 252. If training is finished, the processing method 240 may continue with the step 248. If training remains in progress, the processing method 240 may continue with the step 254.

In the step 254, the map manager 126 may randomly select a trajectory from a collection of observed trajectories. A check may be performed in the step 256 to determine if points remain the selected trajectory. If one or more points remain, a first (or end) point (e.g., X,Y) of the selected trajectory may be isolated (or removed). The isolated point may by applied as an input to the recursive self-organizing map 168. Training equations may be applied in the step 258 to the recursive self-organizing map 168. Thereafter, the training step 246 may return to the step 256 to check for additional points in the selected trajectory.

The training step 246 may continue around the step 256 and the step 258 until the points in the selected trajectory have been considered. The step 256 may return to the step 246 to determine if additional observed trajectories should be considered. If more observed trajectories remain to be considered, the training step 246 may loop around the steps 246-258 until the observed trajectories have been processed.

Various embodiments of the disclosure may aid in planning and decision-making processes of autonomous vehicles. A number of advantages generally exist to using the recursive self-organizing maps for virtual lane estimation. For example, the recursive self-organizing map may be trained with either one observation of another vehicle or a large dataset of observations. Training on a single observation may be done rapidly for online learning in a real driving situation. The recursive self-organizing map may also take advantage of larger datasets, such as overhead video footage from traffic cameras and/or a crowdsourced database, to create more accurate and comprehensive estimations.

The resulting directed graph format may be compatible with many path-planning algorithms that operate on directed graphs. This saves computation time, as the virtual lanes are already in a workable format that does not invoke conversion techniques. Furthermore, along with the spatial information of the virtual lane, the recursive portion of the self-organizing map may encode temporal information about direction of travel.

Embodiments of the disclosure may deal with uncertain conditions, such as accidents or ambiguous visual markings. When such conditions occur, the vehicle 90 may imitate the movements of surrounding vehicles as a starting point for sensible behavior. Over time, this allows the vehicle 90 to gain experience and skills to tackle difficult situations unforeseen by system designers. The observations collected by many cars may also form a crowdsourced database that support improved future iterations of autonomous driving systems.

Use of a recursive self-organizing map for virtual lane estimation generally handles multiple criteria for autonomous vehicles within the single map manager 126, without performing work to convert between representations. In various embodiments, the system addresses issues of difficult-to-detect lane markings by detecting other vehicles and track the motion of those vehicles. The system may also innately address situations where such lane markings are irrelevant to the situation and normal traffic rules are overridden (e.g., a stalled car blocking a lane). Furthermore, current modular approaches to autonomous driving include stages of gathering map information, hypothesizing movements of other agents, and deciding what output data to utilize. The graph-based format of the system is generally in a useful format for representing map-based data, such as the virtual lanes, and may serve as a basis for many different path-planning techniques in commercial use.

While the best modes for carrying out the disclosure have been described in detail, those familiar with the art to which this disclosure relates will recognize various alternative designs and embodiments for practicing the disclosure within the scope of the appended claims.

What is claimed is:

1. A virtual lane estimation system comprising:
   a memory configured to store a road map that corresponds to a portion of a road ahead of a vehicle;
   a sensor configured to observe a plurality of trajectories of a plurality of neighboring vehicles that traverse the portion of the road ahead of the vehicle; and
   a computer configured to initialize a recursive self-organizing map as a plurality of points arranged as a two-dimensional grid aligned with the road map, train the plurality of points in the recursive self-organizing map in response to the plurality of trajectories of the plurality of neighboring vehicles that traverse the portion of the road, generate a directed graph that contains one or more virtual lanes through the road map in response to the points trained to the plurality of trajectories, and generate a control signal that controls navigation of the vehicle through the portion of the road in response to the one or more virtual lanes in the directed graph, wherein
      the recursive self-organizing map is a modified self-organizing map that uses feedback to represent time,
      the directed graph has a plurality of directed edges captured in a sequential order in which the plurality of points were observed, and
      a recurrent layer of the recursive self-organizing map contains a plurality of weights of the plurality of points at an end of the training.

2. The virtual lane estimation system according to claim 1, wherein the training of the recursive self-organizing map uses the plurality of trajectories one at a time.

3. The virtual lane estimation system according to claim 2, wherein the recurrent layer of the recursive self-organizing map:
   receives a current time input, a previous time memory state, and a previous time output at a current time;
   updates the previous time memory state to a current time; and
   generates an output at the current time.

4. The virtual lane estimation system according to claim 3, wherein a grid layer of the recursive self-organizing map contains the plurality of trajectories at the end of the training.

5. The virtual lane estimation system according to claim 2, wherein the computer is further configured to select a random trajectory from the plurality of trajectories during the training.

6. The virtual lane estimation system according to claim 5, wherein the computer is further configured to isolate a first point of the random trajectory.

7. The virtual lane estimation system according to claim 6, wherein the computer is further configured to apply the first point to the recursive self-organizing map during the training.

8. The virtual lane estimation system according to claim 7, wherein the computer is further configured to isolate a second point of the random trajectory, and apply the second point to the recursive self-organizing map during the training.

9. The virtual lane estimation system according to claim 1, wherein the recursive self-organizing map comprises the modified self-organizing map with an input layer from a current time step, and the input layer is an output layer from a previous time step, and the modified self-organizing map implements a neural network with the output layer arranged as the two-dimensional grid.

10. A method for virtual lane estimation comprising:
    reading a road map that corresponds to a portion of a road ahead of a vehicle;
    initializing a recursive self-organizing map as a plurality of points arranged as a two-dimensional grid aligned with the road map using a computer of the vehicle;
    observing a plurality of trajectories of a plurality of neighboring vehicles that traverse the portion of the road ahead of the vehicle using a sensor of the vehicle;
    training the plurality of points in the recursive self-organizing map in response to the plurality of trajectories of the plurality of neighboring vehicles that traverse the portion of the road;
    generating a directed graph that contains one or more virtual lanes through the road map in response to the points trained to the plurality of trajectories; and
    controlling a power plant to navigate the vehicle through the portion of the road in response to the one or more virtual lanes in the directed graph, wherein
       the recursive self-organizing map is a modified self-organizing map that uses feedback to represent time,
       the directed graph has a plurality of directed edges captured in a sequential order in which the plurality of points were observed, and
       a recurrent layer of the recursive self-organizing map contains a plurality of weights of the plurality of points at an end of the training.

11. The method according to claim 10, wherein the training of the recursive self-organizing map uses the plurality of trajectories one at a time.

12. The method according to claim 11, wherein the recurrent layer of the recursive self-organizing map:
    receives a current time input, a previous time memory state, and a previous time output at a current time;
    updates the memory state to a current time; and
    generates an output at the current time.

13. The method according to claim 12, wherein a grid layer of the recursive self-organizing map contains the plurality of trajectories at the end of the training.

14. The method according to claim 11, wherein the training includes selecting a random trajectory from the plurality of trajectories.

15. The method according to claim 14, wherein the training includes removing a first point of the random trajectory.

16. The method according to claim 15, wherein the training includes applying the first point to the recursive self-organizing map.

17. The method according to claim 16, wherein the training includes:
removing a second point of the random trajectory; and
applying the second point to the recursive self-organizing map.

18. The method according to claim 10, wherein the recursive self-organizing map comprises the modified self-organizing map with an input layer from a current time step, and the input layer is an output layer from a previous time step, and the modified self-organizing map implements a neural network with the output layer arranged as the two-dimensional grid.

19. The method according to claim 18, wherein the self-organizing map implements a neural network with the output layer arranged as the two-dimensional grid.

20. A vehicle comprising:
a memory configured to store a road map that corresponds to a portion of a road ahead of the vehicle;
a sensor configured to observe a plurality of trajectories of a plurality of neighboring vehicles that traverse the portion of the road ahead of the vehicle;
a computer configured to initialize a recursive self-organizing map as a plurality of points arranged as a two-dimensional grid aligned with the road map, train the plurality of points in the recursive self-organizing map in response to the plurality of trajectories of the plurality of neighboring vehicles that traverse the portion of the road, generate a directed graph that contains one or more virtual lanes through the road map in response to the points trained to the plurality of trajectories, and generate a control signal that controls navigation of the vehicle through the portion of the road in response to the one or more virtual lanes in the directed graph; and
a power plant configured to propel the vehicle in response to the control signal, wherein
the recursive self-organizing map is a modified self-organizing map that uses feedback to represent time, and
the directed graph has a plurality of directed edges captured in a sequential order in which the plurality of points were observed, and
a recurrent layer of the recursive self-organizing map contains a plurality of weights of the plurality of points at an end of the training.

* * * * *